United States Patent
Kitada et al.

(10) Patent No.: US 8,572,703 B2
(45) Date of Patent: Oct. 29, 2013

(54) SYSTEM AND METHOD FOR AUTHENTICATING A USER OF AN IMAGE PROCESSING SYSTEM

(75) Inventors: Hiroshi Kitada, Tuckahoe, NY (US); Lana Wong, Randolph, NJ (US); Helen Wang, Whippany, NJ (US); Weiyun Tang, Livingston, NJ (US); Andrew Jennings, Boonton, NJ (US); Revathi Vellanki, Morris Plains, NJ (US)

(73) Assignee: Ricoh Americas Corporation, West Caldwell, NJ (US)

(*) Notice: Subject to any disclaimer, the term of this patent is extended or adjusted under 35 U.S.C. 154(b) by 1569 days.

(21) Appl. No.: 11/692,957

(22) Filed: Mar. 29, 2007

(65) Prior Publication Data

US 2008/0244712 A1    Oct. 2, 2008

(51) Int. Cl.
*G06F 7/04* (2006.01)
*G06F 15/16* (2006.01)
*G06F 17/30* (2006.01)
*H04L 29/06* (2006.01)
*H04N 7/16* (2011.01)

(52) U.S. Cl.
USPC ............ 726/7; 726/6; 726/27; 713/155

(58) Field of Classification Search
None
See application file for complete search history.

(56) References Cited

U.S. PATENT DOCUMENTS

| | | | | |
|---|---|---|---|---|
| 6,205,480 | B1* | 3/2001 | Broadhurst et al. | 709/225 |
| 6,823,391 | B1* | 11/2004 | Deen et al. | 709/229 |
| 2001/0049785 | A1* | 12/2001 | Kawan et al. | 713/156 |
| 2006/0077434 | A1* | 4/2006 | Zhang et al. | 358/1.15 |
| 2006/0192990 | A1* | 8/2006 | Tonegawa | 358/1.15 |
| 2006/0230286 | A1 | 10/2006 | Kitada | |

OTHER PUBLICATIONS

U.S. Appl. No. 12/186,720, filed Aug. 6, 2008, Kitada, et al.

* cited by examiner

*Primary Examiner* — Philip Chea
*Assistant Examiner* — Trong Nguyen
(74) *Attorney, Agent, or Firm* — Oblon, Spivak, McClelland, Maier & Neustadt, L.L.P.

(57) ABSTRACT

A system and method for authenticating a user of an image processing system. User credentials are received at an authentication device corresponding to an image processing device, and transmitted to a first server remote from the authentication device. The validity of the user credentials are judged by comparing the received user credentials to authentication information stored at the first server, and a result of the judging is transmitted to the image processing device. The image processing device then requests access to a second server remote from the image processing device, and the second server transmits a request for the user credentials to the first server. After receiving the user credentials from the first server, the second server performs user authentication.

11 Claims, 11 Drawing Sheets

SYSTEM AND METHOD FOR AUTHENTICATING A USER OF AN IMAGE PROCESSING SYSTEM

BACKGROUND OF THE INVENTION

1. Field of the Invention

The present invention is directed to methods and computer-based systems for authenticating a user of an image processing system.

2. Discussion of the Background

Over the past several years, there has been an increase in the number and types of document-related applications available over networks. These applications can include document management systems, such as those specializing in managing documents of various specific contents, for example medical, legal, financial, marketing, scientific, educational, etc. Other applications include various delivery systems, such as e-mail servers, facsimile servers, and/or regular mail delivery. Yet other applications include document processing systems, such as format conversion and optical character recognition systems. Further applications include document management systems used to store, organize, and manage various documents. These document management systems used to store, organize, and manage various documents may be referred to as "backend" applications.

Various systems for accessing these network applications from image processing devices (e.g., scanners, printers, copy machines, cameras) have been contemplated. One system associates a computer with each image processing device for managing the documents with the network applications. The computers communicate with the various network applications to enable the use of the applications by the user of the image processing devices. For example, the computers request and receive from the network applications information about the format and content of the data required by the applications to manage the documents. The computers process this information and configure the image processing devices to provide the correct format and content.

The image processing devices also typically incorporate some type of monitoring system to track the resource usage of the image processing device. These monitoring systems authenticate a user and provide the ability to track copy, print and fax activities based on attributes such as document name, printer, port, date and time, paper size, finishing options and choice between black and white or color. Such a process allows billing reports, invoices, etc. to be generated based on the authenticated user's actions at the image processing device. Thus, before operating an image processing device that includes such a monitoring system, the user must first be authenticated with the monitoring system. Such authentication typically involves the entry of some sort of personal information or data from the user.

Once a user is granted access to the image processing device, an additional authentication step typically is performed to gain access to one or more of the above noted backend applications. For example, the user may additionally log into a server or network to which the image processing device is connected in order to gain access to this server or network.

Thus, the present inventors have realized that current systems may require a user to log in multiple times at a single image processing device in order to both gain access to the image processing device and a backend application associated with the image processing device. The inventors have realized that such redundancy is burdensome for the user of the image processing device, and may force users to memorize different user authentication information associated with each necessary log in procedure.

SUMMARY OF THE INVENTION

The present inventors have determined that there is a need for a more efficient and customizable login procedure for image processing devices and the systems associated therewith. Specifically, the present invention is directed to using authorization information and user credentials based on an authentication procedure at the monitoring system for authentication at a second server and various backend applications without user intervention.

The present invention, therefore, is directed to a system and method for authenticating a user of an image processing system. User credentials are received at an authentication device corresponding to an image processing device, and transmitted to a first server remote from the authentication device. The validity of the user credentials are judged by comparing the received user credentials to authentication information stored at the first server, and a result of the judging is transmitted to the image processing device. The image processing device then requests access to a second server remote from the image processing device, and the second server transmits a request for the user credentials to the first server. After receiving the user credentials from the first server, the second server performs user authentication.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
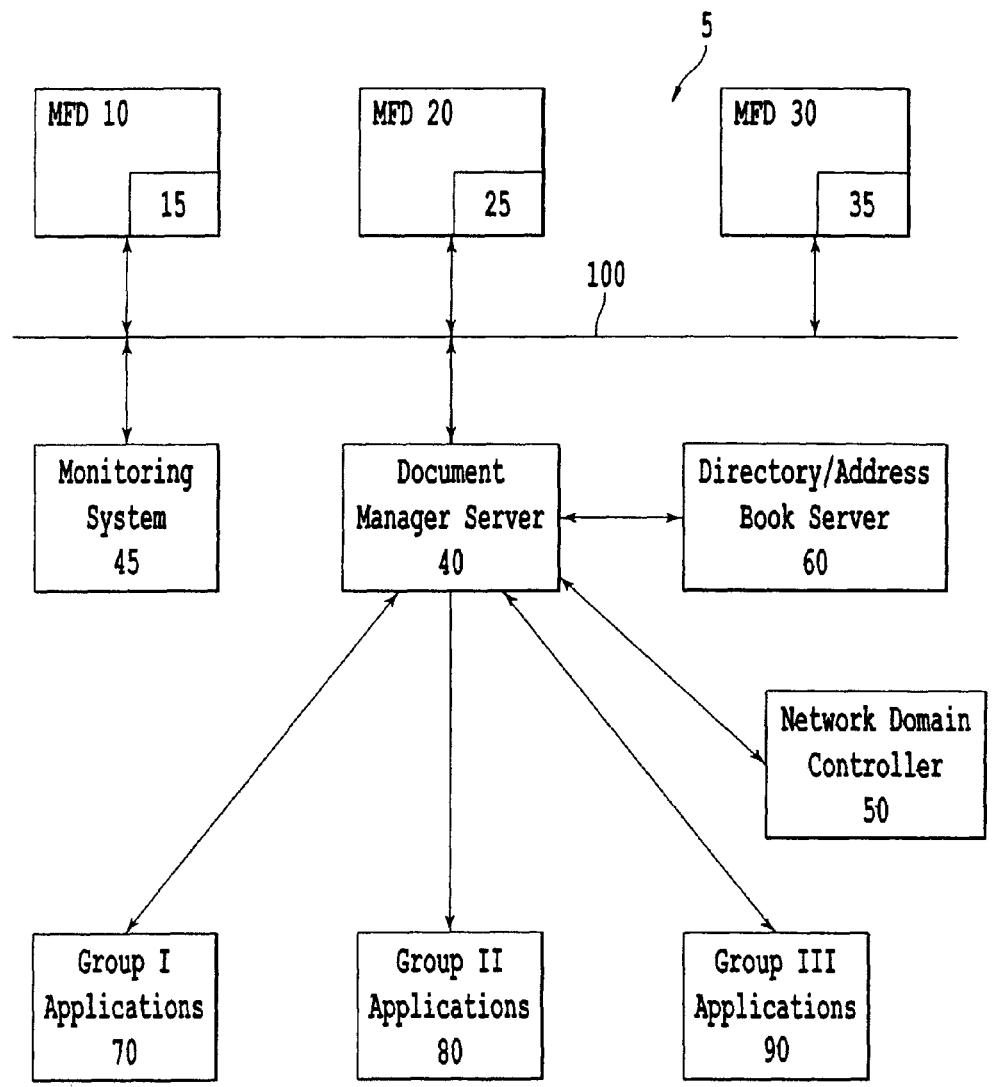
FIG. 1 is a block diagram showing an overall system configuration according to one embodiment of the present invention.

Referring now to the drawings, wherein like reference numerals designate identical or corresponding parts throughout the several views, FIG. 1 is a block diagram of a system 5 for managing documents according to the present invention, and in particular to allow a document manager server 40 to manage documents and files by processing information related to applications, which can be grouped in different groups I-III. The system 5 includes a network 100 that interconnects at least one, but preferably a plurality of image processing devices which may be implemented as multifunction devices (MFDs) 10-30, to a document manager server 40. The network 100 preferably uses TCP/IP (Transmission Control Protocol/Internet Protocol), but any other desirable network protocol such as, for example IPX/SPX (Internetwork Packet Exchange/Sequential Packet Exchange), NetBEUI (NetBIOS Extended User Interface), or NetBIOS (Network Basic Input/Output System) is possible. The network 100 can be a local area network, a wide area network, any type of network such as an intranet, an extranet, the Internet or a combination thereof. Other communications links for the network 100, such as a virtual private network, or a wireless link, or any other suitable substitute may be used as well.

As shown in FIG. 1, the devices 10, 20, 30 can be multifunction devices, or "MFDs." An MFD may incorporate or be any one of a plurality of a scanner, a copy machine, a printer, a fax machine, other office devices, and combinations thereof. Any one or combinations of these devices are referred to as a MFD, generally. Various types of MFDs are commonly known in the art and share common features and hardware with the MFDs of the present invention. Such an MFD combines digital imaging and Internet capabilities so that one can capture still images, sounds or videos and share such multimedia using wired or wireless connections from various locations. The MFD can create web pages, send and receive e-mails with attachments, edit images, FTP files, surf the Internet, and send or receive a fax. In another embodiment, the MFD is one of a combination of a scanner, photocopier and printer.

The MFD also includes or is connected to a user authentication device 15, 25, 35 which is configured to accept information input via a keypad, from an electronic card or memory, and/or a biometric device configured to sense biometric information input by a user. Examples of suitable biometric devices include, but are not limited to, retinal scanners, fingerprint readers, voice scanners or any other type of biometric reader device. Other devices used to authenticate users may include a proximity scanner, automatic tollbooth payment devices, cell phones, etc. More generally, the authentication devices may be any suitable device which is capable of identifying a user for the purposes of performing user authentication at the monitoring system, MFD, document manager server or backend application.

It should be noted that while the term "smartcard" may be used in the application, this term refers to any type of card or memory device for storing user information and capable of being read by an electronic device. Also, the card and the device used to read the card may be a scan sensor used to read directly from the card, or alternatively a proximity sensor configured to read data from the device without physically making contact with the card.

Figure 7:
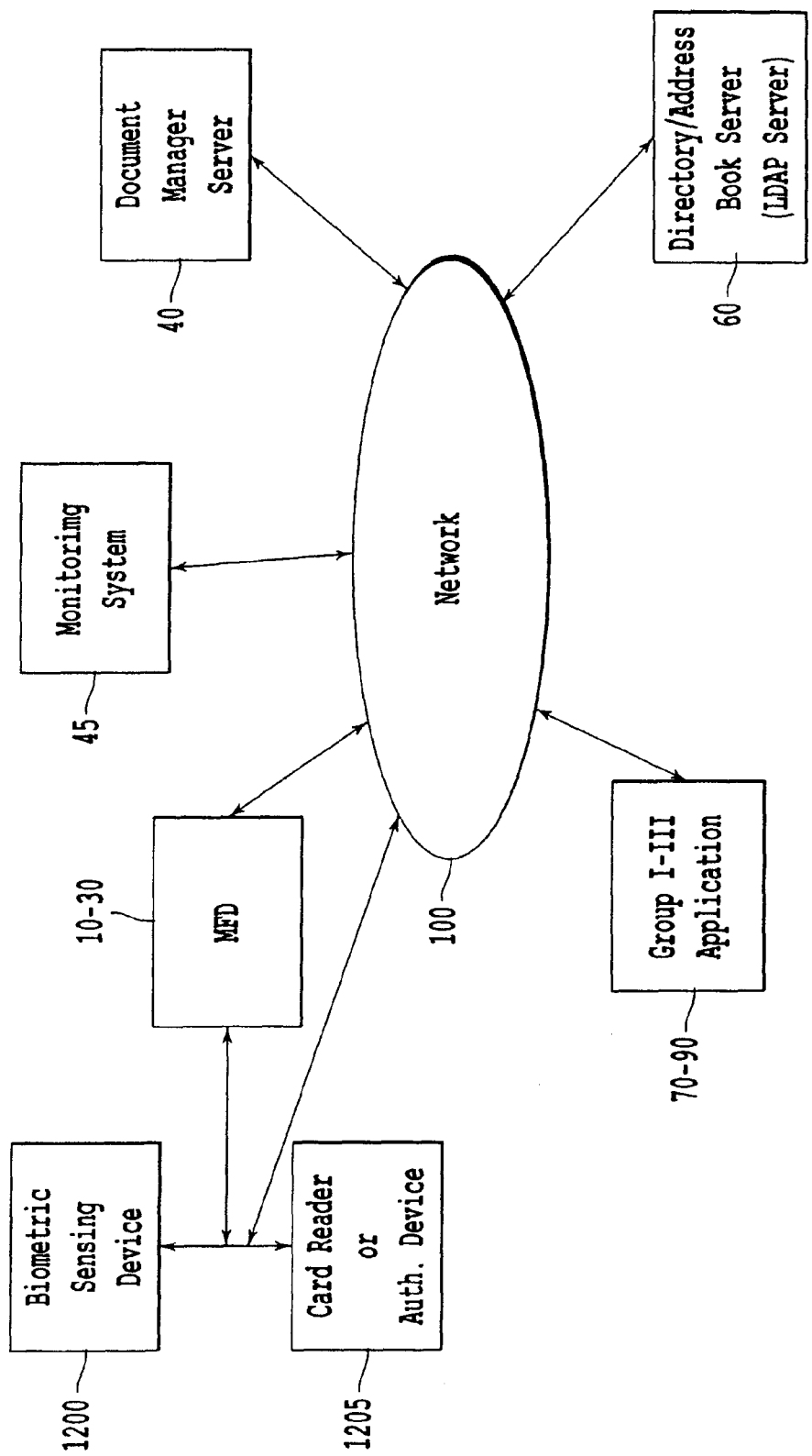
FIG. 7 is a diagram illustrating the overall system configuration of the system according to one embodiment of the present invention.

As depicted at FIG. 7, the user authentication devices may be located within or near the image processing device, and may, or may not be, in communication with the image processing device. In one embodiment, the authentication devices may communicate directly with the MFD to perform user authentication. In another embodiment, the authentication device may be connected to a network to send received authentication information to any one of a number of systems connected to the network, which are capable of performing user authentication. In such a configuration, the user's credentials are transmitted from the authentication device to, for example, the monitoring system 45 or document manager server 40. The MFD is then informed of the result of the authentication, thereby permitting or denying the user access to the MFD. The authentication result may be sent to the MFD directly from the monitoring system 45, or may be forwarded from the authenticating device after it receives an authentication result. As will be discussed in greater detail below, authentication at the monitoring system 45 may be used by the document manager server 40, and the various backend applications connected thereto to perform a single sign-on authentication procedure.

Each of the MFDs and user authentication devices may be connected by any suitable type of wired or wireless connection to transfer information. Moreover, the communications between the monitoring system 45 and the authentication devices may be similar to the connection between the MFD and the document manager via network 100, discussed above. Regardless, any other connection between the authentication devices and the monitoring system 45 suitable for the exchange of user credentials and authentication results may be employed.

In an exemplary embodiment the authentication devices are configured to interact with the Equitrac Office™ system. This system allows for a user to be authenticated with the Equitrac system by entering user authentication information at one of the authentication devices, which is then sent to an Equitrac Server (e.g., monitoring system 45). Once a user is authenticated with the Equitrac system, the system tracks copy, print and fax activities based on attributes such as document name, printer, port, date and time, paper size, finishing options and choice between black and white or color. Other types and brands of authentication devices and cost accounting systems may also be used with the invention.

As shown in FIG. 1, the document manager server 40 is connected to a directory/address book server 60 (or "directory server" or "global directory"). The directory server 60 can include information such as the names, addresses, network addresses, e-mail addresses, phone/fax numbers, other types of destination information, and authorization of individuals. Other information can also be included in the directory server 60. Examples of directory servers 60 compatible with the present invention include, but are not limited to, Lotus Notes™, Microsoft Exchange™, and LDAP ("Lightweight Directory Access Protocol") enabled directory servers. LDAP is a software protocol that enables a user to perform network authentication, locate organizations, individuals, files, devices in a network. The directory server is configured to receive user information entered at the authentication device or image processing device and authenticate the user for the network.

The document manager server 40 can also be connected to a network domain controller 50 that controls authentication of the MFD user to a network. The network domain controller 50 is, for example, a server that responds to security authentication requests, such as logging in, within its domain. The network domain controller 50 may be backed up by one or more backup network domain controllers that can optionally also handle security authentication. Examples of a directory server 60 and a network domain controller 50 are disclosed in U.S. application Ser. No. 10/243,645, filed Sep. 16, 2002, the entire content of which is hereby incorporated by reference.

Briefly, the system 5 provides access for the users of the MFDs 10-30 to the information stored at the directory server 60 via the document manager server 40 when the user is authenticated at the image processing device. The directory server 60 is capable of retrieving preference information related to the user's credentials and transmits this preference information to the MFDs 10-30. This preference information may include information relating to scan settings, such as resolution, density, scan mode, color, paper size, file format, or any additional settings that can be adjusted at the MFD. The preference information may also include information related to a destination of the processed image, including a specific e-mail address, a backend application, a middle processing system, or any other network application configured to accept the processed data. A middle processing system may include a file formation conversion system, optical character recognition, or any similarly suited system as will be described in greater detail below. Also, the preference information may include a software plug-in, which will be discussed in greater detail below, or any other information related to changing the functionality of the MFD. These plug-ins also allow the document manager server to access user credential information stored at the MFD following a successful authentication at the monitoring system 45, and subsequently the document manager server 40 as discussed below.

A user can also request a search of the company's global directory stored at the directory server 60. The document manager server 40 can pass the search request to the directory server 60 and can receive the search results (e.g., e-mail addresses and/or fax numbers) from the directory server 60. The document manager server 40 can pass the search results to the MFD 20, which can temporarily store and display them. The user can select a displayed result (e.g., an e-mail addresses or a fax number), scan a document, and request that the scanned document be transmitted, e-mailed and/or faxed to the selected destination.

The document manager server 40 can be configured to act as an intermediate agent, or a gateway between a plurality of network applications 45, 50, 60, 70, 80, and 90 and the MFDs. The applications 70, 80, and 90 can include for example an e-mail server, a fax server, a file format conversion system, an optical character recognition (OCR) system, a document management system and a file storage system or any combination of multiples thereof. The document management server 40 is capable of supporting a plurality of backend applications such as various document management systems, or file storage systems. In a preferred embodiment, the e-mail server is incorporated into the document manager server 40. An example of a document management system is disclosed in U.S. application Ser. No. 09/795,438, filed Mar. 1, 2001; and in U.S. application Ser. No. 10/116,162, filed Apr. 5, 2002, the entire contents of which are hereby incorporated by reference.

The applications can be grouped, for example in Groups I-III. Group I can be a delivery system group including an e-mail server and a fax server; Group II can be a middle processing group including a file format conversion system and an optical character recognition system; and Group III can be a backend application group including a document management system and a file storage system. Groups I-III can include a plurality of devices from each category. For example, the document management server 40 can be connected to a plurality of applications from each group. The document manager server 40 can direct documents to several applications within each group. In a preferred embodiment, the document manager server 40 delivers a document to several of the applications within the delivery system group, but delivers the document to one or a plurality of the application within the middle processing group and to one or a plurality of the applications of the backend application group. For example, the document manager server 40 can deliver a document to the e-mail and fax servers, to the OCR system, and to a document management system. Other combinations are possible in other embodiments.

In a preferred embodiment, the MFDs 10-30 and the document manager server 40 exchange data using the protocol HTTP ("Hypertext Transfer Protocol") or HTTPS (HTTP over Secure Socket Layer) over the network 100. Other protocols such as TCP/IP, IPX/SPX, NetBEUI, or NetBIOS, for example can equivalently be used with the present invention. Preferably, the MFDs 10-30 and the document manager server 40 exchange data using the format XML ("Extensible Markup Language"). Other formats, such as HTML, can equivalently be used with the present invention.

In one embodiment, the document manager server 40 can include an MFD profiler 280 (shown in FIG. 2) that manages profiles for the MFDs 10-30. The administrator of the system 5 can create, change and maintain the profiles via a profile user interface on the document manager server 40. A profile includes information (e.g., parameters) sent from the document manager server 40 to an MFD. Based on this information, the MFD can adjust its user interface and functions so as to properly interface with the document manager server 40. The information may also include software plug-ins processed by the MFD to allow the operation of the MFD to be modified based on the existence or introduction of a backend application. The document manager server 40 includes software plug-ins corresponding to the backend applications connected to the document manager server 40. For example, the MFD can display selections allowing a user to select options (e.g., a particular delivery system, a middle processing system, or a backend application) available to the MFD via the document manager server 40. Information included in the profile can be the identity of the various applications 70-90 connected to the document manager server 40. The profiler 280 receives identification information from an MFD (e.g., the serial number) and uses this identification information to check whether the MFD is registered within a register, e.g., a data table stored in a memory of the document manager server 40. If registered, the profiler sends the MFD a profile assigned to the MFD. If the MFD is not registered, the profiler can register the MFD and send the MFD a profile. The profiler can store more than one profile. In a preferred embodiment, one profile is assigned to each MFD, and more than one MFD can share the same profile. While the term "software plug-in" has been used, any type of software, programming, or chip can be used to modify the operation of the MFD.

Examples of parameters in a profile include, but are not limited to:
 a profile ID, which identifies the profile;
 an LDAP Enabled parameter, which indicates whether or not the LDAP tree search is enabled on the document manager server 40 using the directory server 60;
 a Base Domain Name (DN) parameter, which provides a default field of search for the LDAP tree when the LDAP search is enabled;
 a Network Authentication parameter, which indicates whether or not network authentication is enabled using the network domain controller 40;
 a Time-Out parameter, which indicates the time period that should elapse before the MFD resets and requires the user to enter login information;
 a Max Result Count parameter, which determines the maximum number of LDAP query results returned;
 a Fax Option parameter, which indicates whether or not a fax server is connected to the document manager server 40;

a Post Scan Processing parameter, which indicates what post scan processing system is connected to the document manager server 40, post scan processing systems may include, for example an e-mail server, a file format conversion system, an optical character recognition system, etc.;

a Backend parameter, indicating which backend applications are connected to the document manager server 40 and are able to be accessed by the MFD, such backend applications may include, a document management system or a file storage system, or another similar type of system; and a Software Plug-in which contains and executable file allowing the image processing device to perform specific processing tasks (e.g., user authentication) related to one or a plurality of backend applications.

Other parameters can also be included in the profile. For example, parameters reflecting specific user ID, default size of papers, scanning resolution setting, condition of the document feeder, department code for billing image processing operations, additional scanning job parameters for the specific user ID, or any additional parameters may be used.

The Backend parameter may also initiate an authentication step to determine if a user has already logged into the network and been automatically authenticated to operate the backend application based on the network authentication. If the Backend parameter indicates that a software plug-in is required for the MFD device to properly interface with the backend application, then the MFD transmits data to the document manager server 40 requesting the receipt of a software plug-in.

Figure 5A:
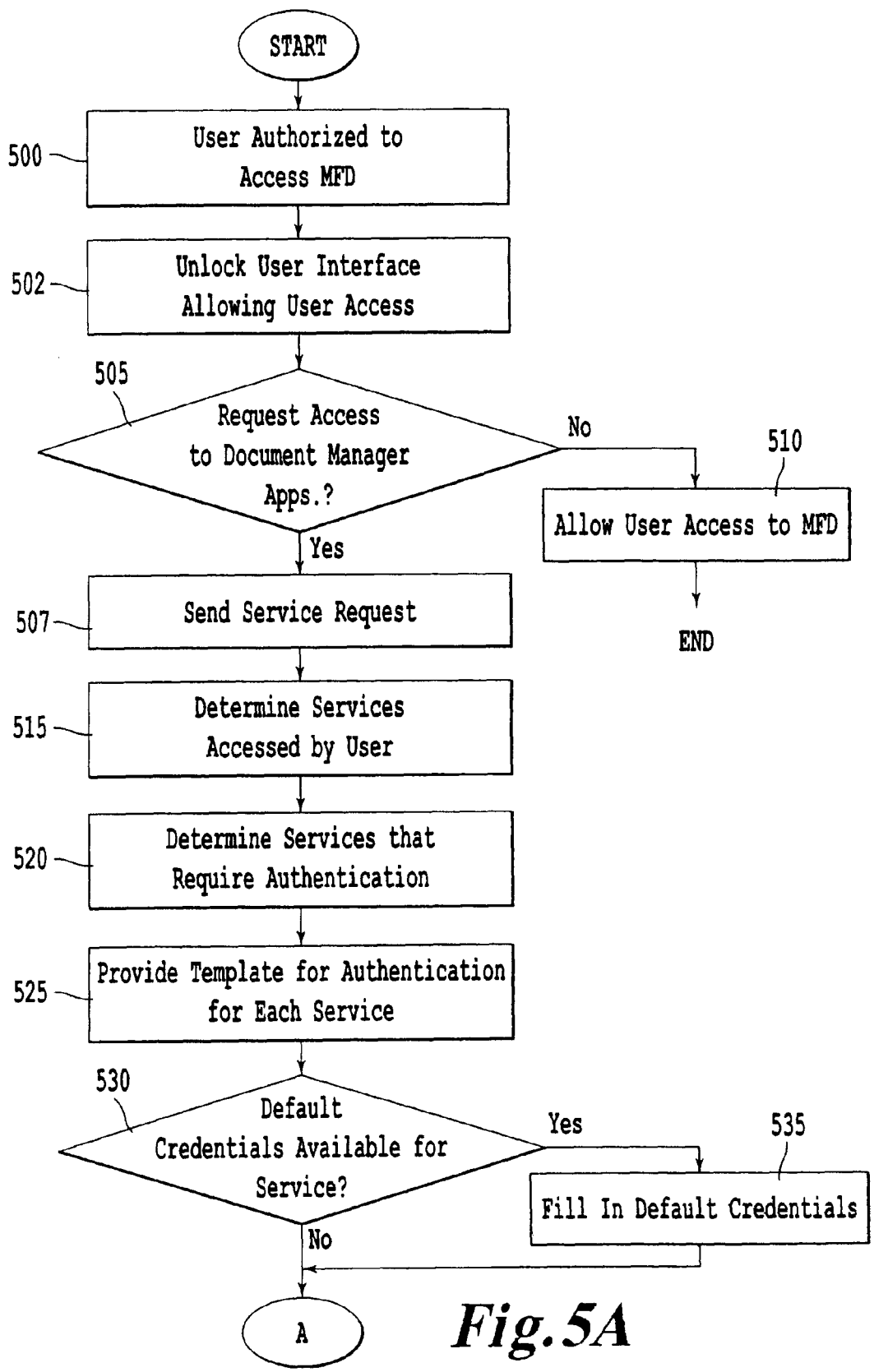
FIGS. 5A and 5B is a flowchart illustrating the steps for performing user authentication at the document manager server and backend applications according to one embodiment of the present invention.
Figure 5B:
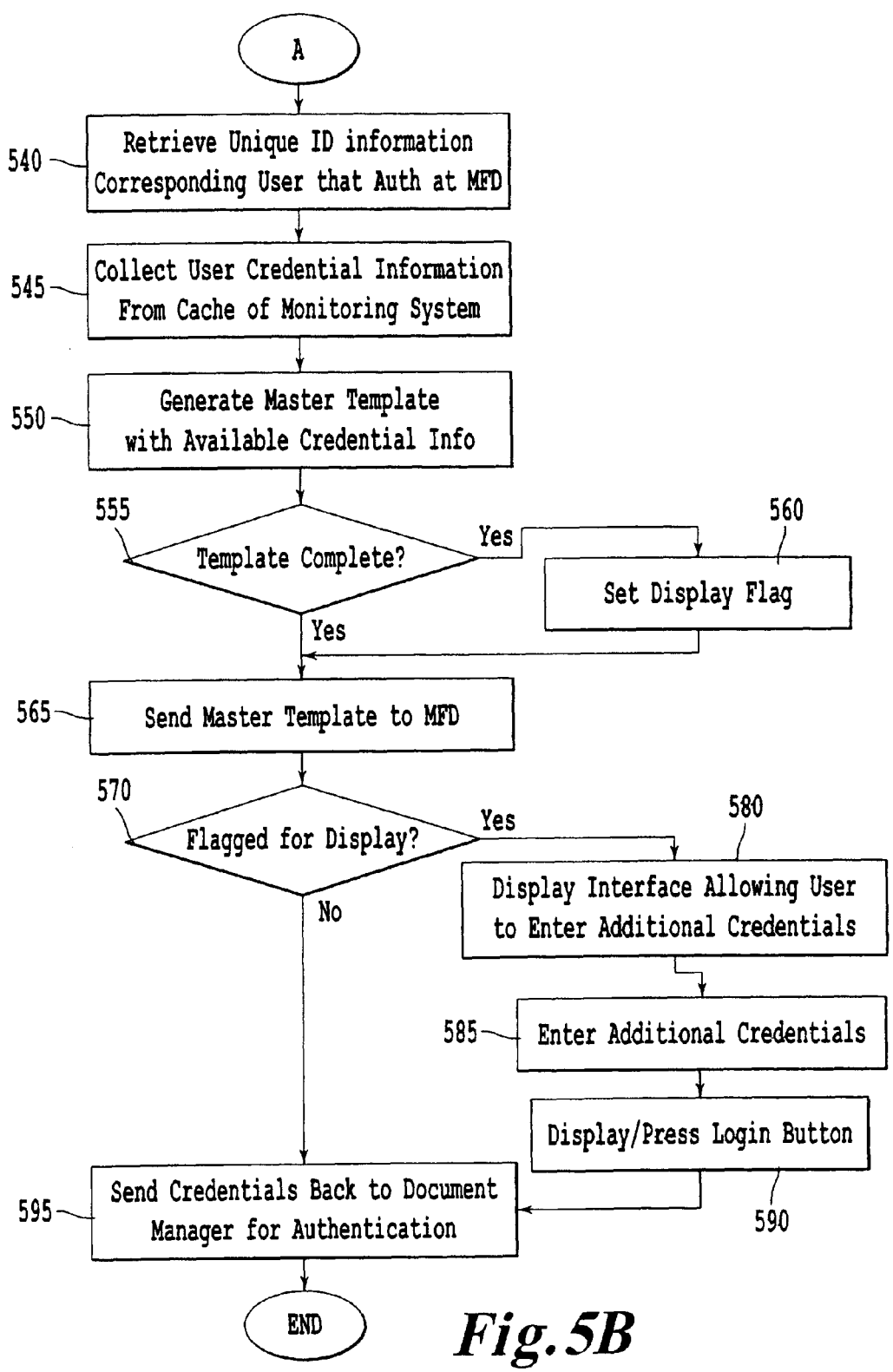

In the context of the authentication procedure disclosed below with reference to FIGS. 5A-5B, the profile may be accessed when the document manager receives a request from the MFD including identification information corresponding to the MFD. Alternatively, the profile may be accessed once the user is authenticated at the document manager server and associated backend applications. Regardless, the plug-ins corresponding to each backend application are used to form the login template discussed in FIGS. 5A-5B.

Figure 2:
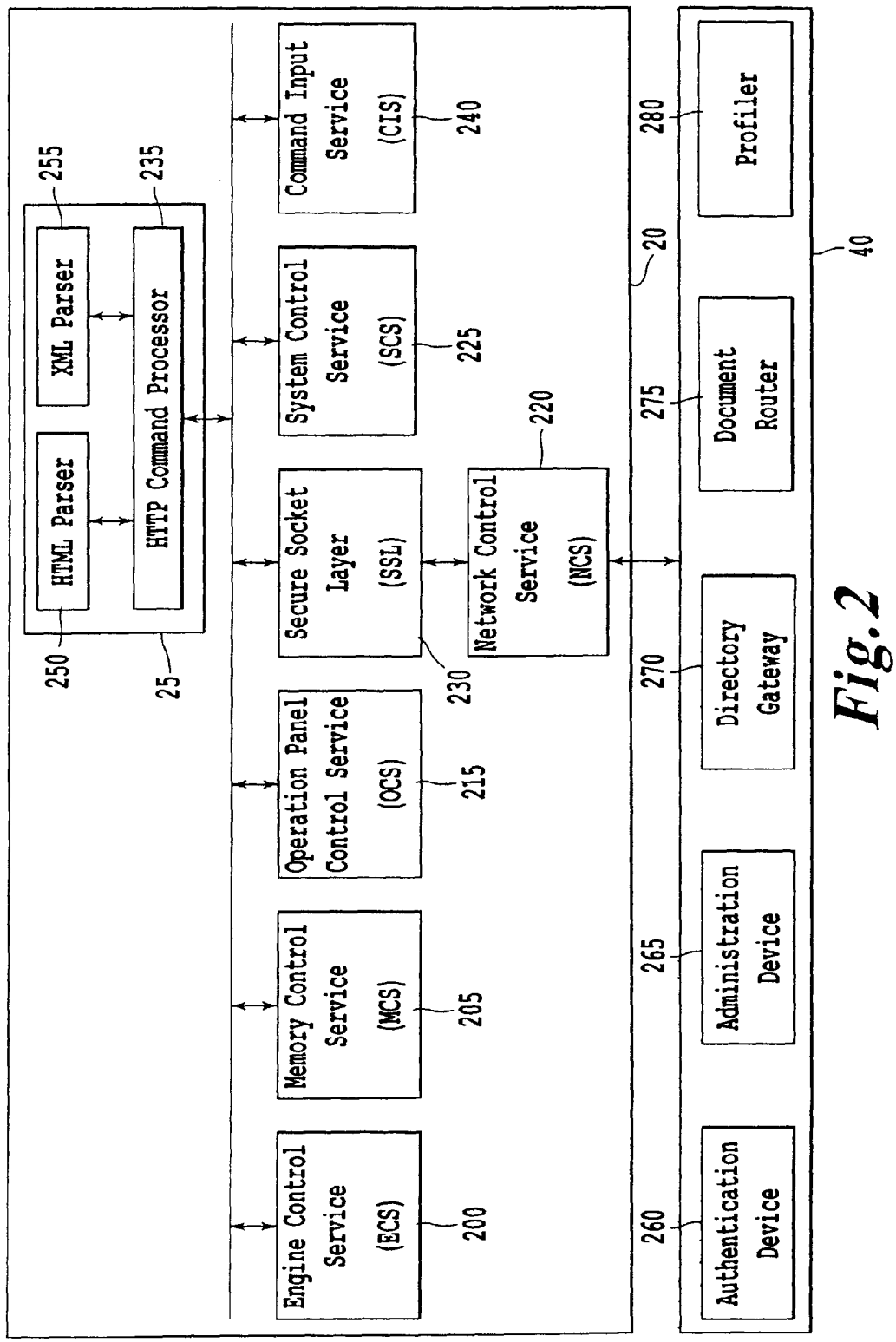
FIG. 2 is a block diagram illustrating components of the image processing device and document manager server according to one embodiment of the present invention.

FIG. 2 illustrates an MFD 20's browser 25 configured to exchange information between the MFD 20 and the document manager server 40 according to one embodiment of the present invention. An example of a browser 25 is disclosed in U.S. application Ser. No. 10/243,643, filed Sep. 16, 2002, the entire content of which is incorporated by reference. Further details of the browser 25 are set forth below. FIG. 2 shows the software components of the document manager server 40, which includes an authentication device 260 configured to perform the authentication functions discussed below. The document manager server 40 also includes an administration device 265 which allows the system administrator to administer the system 5. For example, the administrator of the system can access the profiler 280 via the administration device 265 to set user profiles and/or the MFD profiles for the MFDs 10-30 connected to the document manager server 40. A system administrator may also access the administration device 265 to set the single sign-on feature disclosed below with reference to FIGS. 5A and 5B. A directory gateway 270 is also included within the document manager server 40 and is configured to communicate with the directory server 60. The document manager server 40 also includes a document router 275 configured to route the documents received from the MFDs to the appropriate applications 70, 80 and 90.

As shown in FIG. 2, the MFD 20 includes an engine control service (ECS) 200 that controls, for example, the scanning engine of the MFD 20. A memory control service (MCS) 205 controls access to the memory of the MFD 20. This MCS 205 also stores a user credentials used to log into the monitoring system 45 or any other external authentication system. As discussed below, this user credential information may be accessed by the authentication device 260 and/or profiler 280 to perform authentication at the document manager server 40 and various backend applications connected to the document manager server.

An operation panel control service (OCS) 215 generates outputs which are displayed on the touch-panel type liquid crystal display (LCD) of the MFD 20. It should be noted that the display and user interface of the MFD 20 is not limited to an LCD display, but may also be any other suitable device, or combination of devices, such as but not limited to LCDs, light-emitting diode (LED) displays, cathode ray tube (CRT) displays, plasma displays, keypads, and/or keyboards.

A system control service (SCS) 225 controls and/or monitors sensors within the MFD 20. For example, the SCS 225 controls the touch screen sensors, paper jam sensors and scanning operation sensors. Accordingly, the SCS 225 can manage the status of the MFD 20 based on the information from the sensors.

A network control service (NCS) 220 controls communication between the browser 25 and the document manager server 40. Optionally, a secure socket layer (SSL) 230, in the form of a communication formatting device or routine, provides added security for communications between the NCS 220 and the browser 25.

A command input service (CIS) 240 processes input information, for example, from the LCD touch panel and/or a keypad of the MFD 20. A user of the MFD can enter information and commands using the LCD touch panel and the keypad. The CIS 240 can process such information and commands entered by a user (e.g., forwarded to the CIS 240 by the SCS 225). The CIS 240 can generate a command (e.g., a display command) based on such processing and transmit the command to other components of the MFD (e.g., to the OCS 215 to display a graphic on the LCD). The CIS 240 can also exchange information and commands with the NCS 220 for processing with the browser 25 in connection with the server 40.

Conventional MFDs include ECSs, MCSs, OCSs, NCSs, SCSs, and CISs which are firmware for implementing and controlling each hardware component of the MFD. In the present invention, however, the NCS 220 is configured to communicate with the browser 25. For instance, the NCS 220 has additional capabilities for communicating using the HTTP protocol. The NCS 220 is also configured to communicate with the server 40 so that the NCS 220 exchanges data between the browser 25 and the server 40. For example, The NCS 220 can exchange user information with the server 40 and receive a profile, can transmit a request for an e-mail address and can receive from the server 40 a selected e-mail address, or the NCS 220 can exchange user credential information with the monitoring system 45 and can receive authentication confirmation from the monitoring system 45 (and from the directory server 60) during an authentication process. The NCS 220 is also capable of receiving plug-in information from the document manager server 40 which is capable of performing the authentication procedure described below or altering the user interface of the MFDs.

The browser 25 includes an HTTP command processor 235 that communicates with the network control service (NCS) 220 of the MFD 20. For example, a request for an e-mail address entered by the user via the MFD keypad, or a request for displaying information on the LCD can be passed from the NCS 220 to the browser 25 by the HTTP command processor 235. The HTTP command processor 235 can exchange data in the HTML format with the browser's HTML parser 250, and can exchange data in the XML format with the XML parser 255. The parsers 250 and 255 can check the data from the HTTP command processor 235 for syntax and process the data for HTTP command processor 235. The present invention can include conventional parsers, which are conventionally included as part of a compiler.

The HTTP command processor 235 can be provided with a program code, or software plug-in, for implementing a specific application, such as user authentication processing as discussed below. The HTTP command processor 235 can process information based on definitions of the specific application. For example, the HTTP command processor 235 can process information provided by the user, such as user credentials (e.g., username, password, biometric identification, etc.), and generate an HTTP request based on this processing for the server 40. The HTTP command processor 235 can transmit this HTTP request to the NCS 220 to be transmitted to the server 40. The HTTP command processor 235 can also receive plug-in information relating to specific backend application functionalities, or authentication processes necessary for gaining access to the document manager server 40 or a backend application connected to the document manager server. These plug-ins also allow users to add processing instructions, metadata, and other indexing information to the image file transmitted to the document manager server 40.

The HTTP command processor 235 can also process information received from the server 40 (via the NCS 220). For example, the HTTP command processor 235 can receive an HTTP response generated by the server 40 which includes a profile with parameters or software plug-ins for operating the MFD. These software plug-ins also indicate user credential information that may be necessary for a user to be authenticated at the document manager server 40, or any system connected to the document manager server. As noted above, and as discussed below in detail, a plug-in may also be associated with the authentication procedure performed for the monitoring system 45. This information may be obtained by the document manager server 40, and be used to fill in the user credential and authentication information needed for the plug-ins that require additional user authentication. The HTTP command processor 235 can process this information and generate commands to control the MFD in accordance with the information, e.g., can request the MFD to display a menu with the appropriate buttons, or to scan according to the scanning job parameters for the specific user ID. As another example, the HTTP command processor 235 can generate a graphic drawing command for the LCD panel. The HTTP command processor 235 can transmit the commands to the appropriate MFD firmware (e.g., the OCS 215) to be executed.

Figure 3:
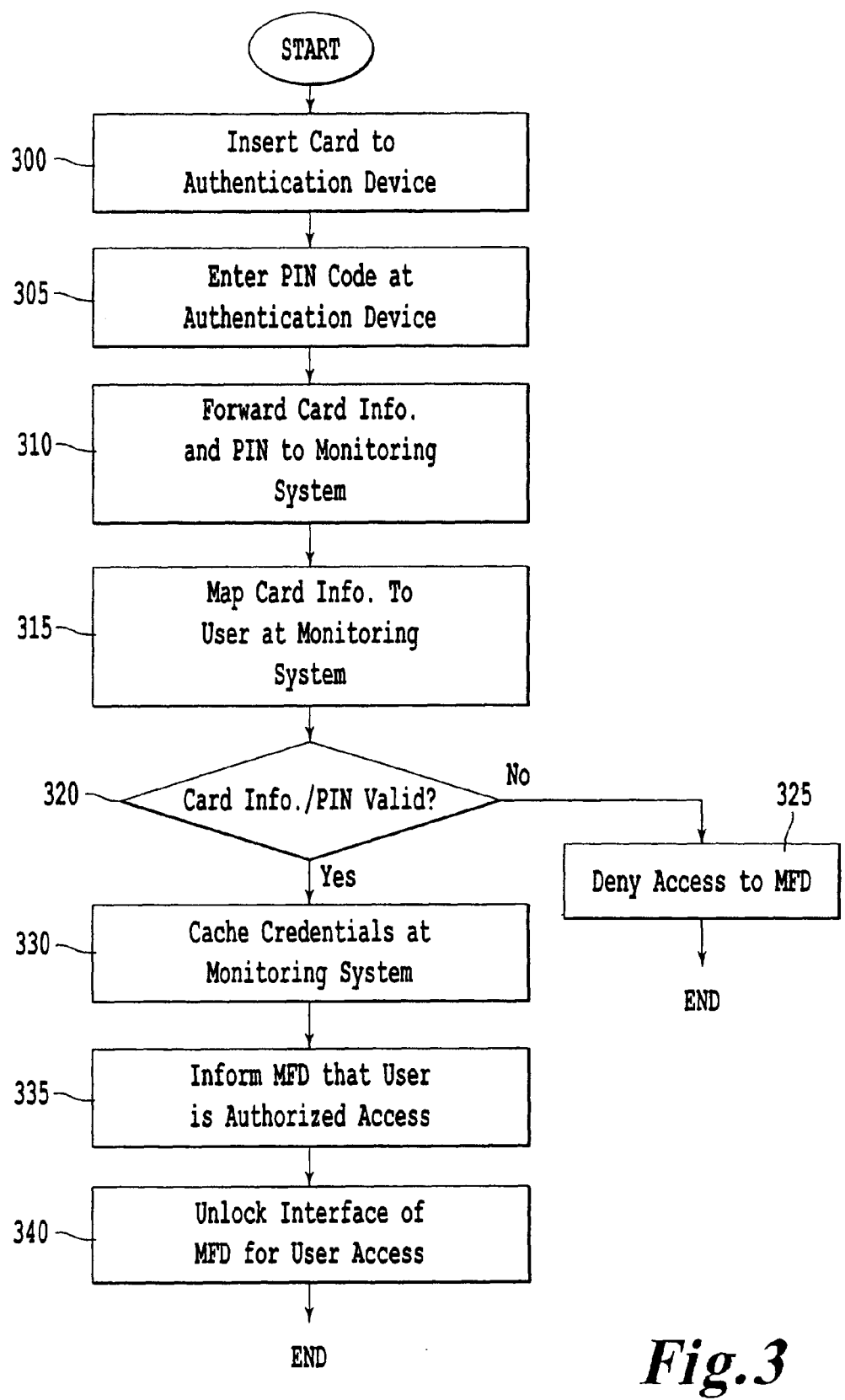
FIG. 3 shows an example of a process for performing authentication at the monitoring system according to one embodiment of the present invention.
Figure 4:
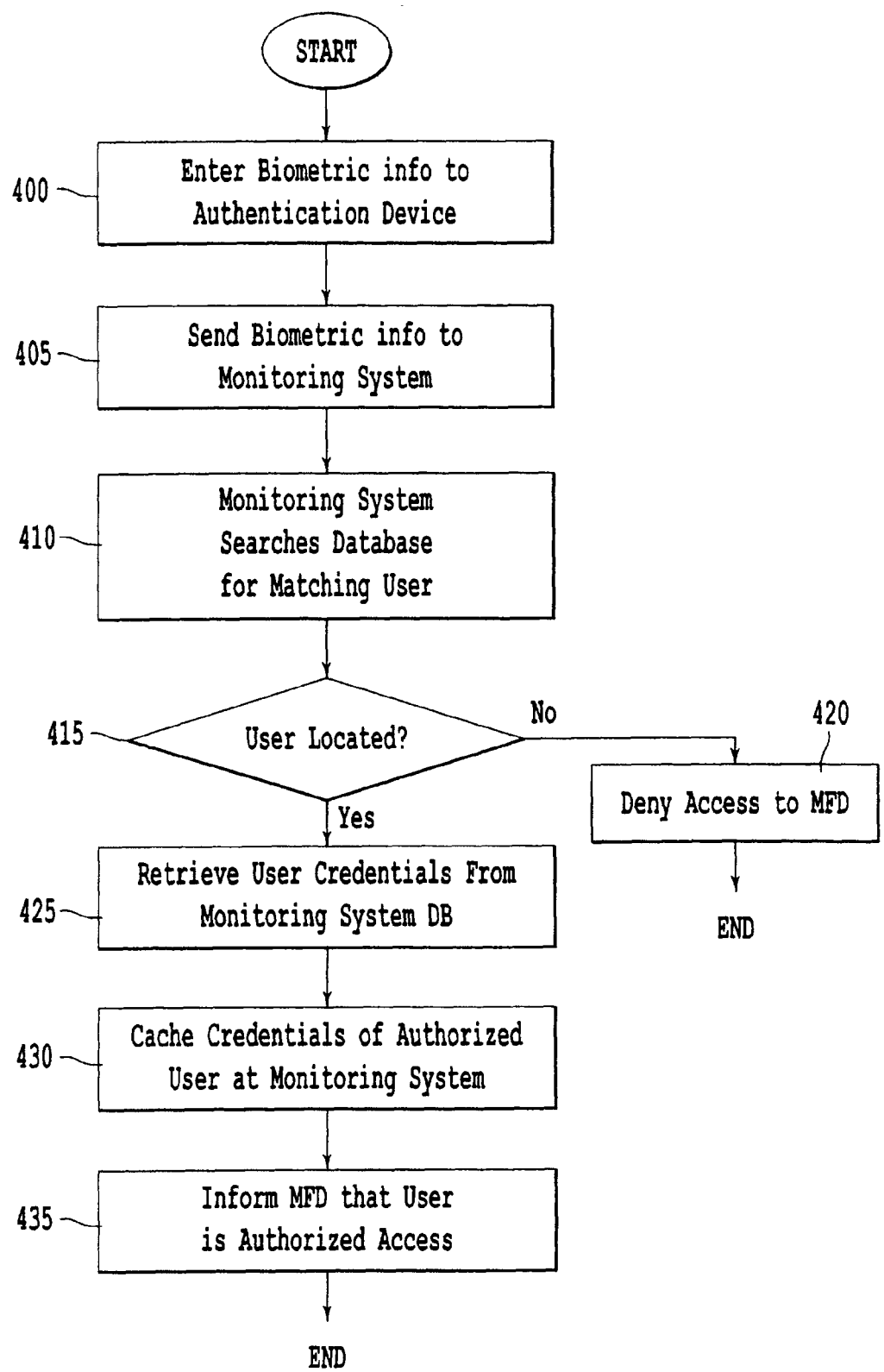
FIG. 4 shows an example of a process for performing authentication at the monitoring system according to one embodiment of the present invention.

FIGS. 3 and 4 are flowcharts depicting exemplary steps performed while performing authentication at an external system, for example monitoring system 45 via any one of the authentication devices 15, 25, 35.

Specifically, the process depicted at FIG. 3 illustrates a method of performing authentication at the monitoring system 45 using a card-type authentication device. At step 300 the user inserts a card into the authentication device. As depicted in FIG. 7, the authentication device 15-35 may be located within the MFD 10-30 or it may be located externally to the MFD 10-30, and is configured to communicate with an external system, such as monitoring system 45. Other types of authentication devices can be used, such as an optical reader, and it is not necessary to actually insert a card into an authentication device, depending on the type and the design of the authentication device. The authentication device in this embodiment is, for example, a card reader and an interface which allows a user to enter a PIN number or other personal information associated with the user. Further, the monitoring system may perform the authentication process individually and communicate the result of the authentication with the MFD 10-30.

The user is prompted for a personal identification number (PIN) at step 305. This prompting can be done before, after, or simultaneous to the card reading. Alternatively, the user may be required to enter biometric information related to a physical attribute of the user. This may include reading the user's fingerprint, scanning a user's retina, sensing a user's voice, or performing a facial recognition on the user. This entered biometric information may then be transformed into a mathematical representation which is compared to a mathematical model of the user's specified biometric information stored in the card or at the monitoring system.

At step 310, the card information and associated PIN or biometric information (e.g. credentials) are sent to the monitoring system. The monitoring system includes a database that associates user credentials with specific users, allowing identification and authentication of a user based on the received credential information. At step 315, the received user credential information is mapped to a user stored in the database at the monitoring system. At step 320, the monitoring system determines if the received credential information corresponds to an authorized or unauthorized user. If, at step 325, the user is not found or is not authorized to access the MFD, then the monitoring system notifies the MFD to prevent the user from accessing the device. Alternatively, if the user is found to be authorized to access the system at step 320, the user's credentials, and optionally additional information related to the user, is cached at the monitoring system 45 to later be accessed by the document manager server 40. At step 335, the monitoring system 45 informs the MFD device that the user is authorized to access the system. At step 340, the MFD grants the user access to the device and unlocks the user interface allowing the user to access other systems via the document manager server.

One example of user credential information that may be stored at the card and correlated with a user at the database of the monitoring system is a digital signature. The monitoring system may determine the validity of the received digital signature and authorize or disable access to the MFD accordingly. This digital signature is then cached at the monitoring system so that is can easily be accessed by a plug-in of the document manager server for subsequent authentication procedures and to retrieve a profile corresponding to the user.

FIG. 4 depicts a process similar to that depicted in FIG. 3, but is directed to performing user authentication using a biometric authentication device. As noted above, the authentication device 15-35 may be any one, or a combination of, a retinal scanner, fingerprint reader, voice scanner, or any other type of biometric device.

At step 400 the user presents biometric information to the authentication device, which detects the biometric information using any one of the above-noted biometric scanning/detecting mechanisms. Other types of authentication devices can be used, such as an optical reader, and it is not necessary to actually insert a card into an authentication device, depending on the type and the design of the authentication device. At step 405 the biometric information is detected and mapped to a mathematical equivalent, by conventional well known methods, before being transmitted to the monitoring system for identification and/or authentication. At step 410 the monitoring system 45 searches a database for a match to the received detected biometric information. If a match is not found at step 415, the monitoring system 45 informs the MFD that the user is not authorized to access the device. The MFD accordingly denies access to the user at step 420.

If, however, a match is found at step 415 the monitoring system determines if the user corresponding to the received biometric information is authorized to access the MFD. If the user is authorized, at step 425 the monitoring device retrieves the user's credentials from the database and stores (step 430) the credentials in a cache memory to be later accessed by a document manager server 40 for subsequent authentication. The credential information that is cached may only include the biometric information, but preferably also includes additional information stored in the database of the monitoring system that matches the received biometric information. This additional stored information may include the identity of a user, a username of a user, password, or other additional user information used by the document manager server 40 for authentication purposes. Step 435, which may be performed before or after the user credential information is cached (i.e., steps 425 and 430), includes informing the MFD that the user is authorized to access the MFD. The MFD may then allow the user to access the device by unlocking the user interface.

FIGS. 3 and 4, as discussed above, relate to performing user authentication using an authentication device and the external monitoring system. User credentials, either received from a user, or retrieved from a database of the monitoring system, are then cached at the monitoring system to allow for efficient access by an authentication procedure at the document manager server 40. FIGS. 5A and 5B illustrate a process in which the cached user credential information is accessed to allow for easier user authentication at the document manager server 40 and the various services connected to the document manager server.

The process begins with authentication at an external system such as the monitoring system 45, as noted above (i.e., step 500). At step 502 the user interface of the MFD is unlocked and an user is presented with an interface allowing the user to operate the MFD. The options presented on the user interface may include conventional processing functions of a MFD, as discussed above, and may also include options to login and access backend services via the document manager server.

Step 505 determines whether the user wishes to access the document manager server and related backend applications. If the user does not request access to services related to the document manager server 40, flow proceeds to step 510 and the user is permitted to access the MFD to perform conventional operations. The process then ends. It should be noted that the user may choose to access the document manager services at another time, at which point the process would pick-up at step 515. If step 505 determines that access is requesting flow proceeds to step 507, which sends a request to a document manager server. This request includes information identifying the requesting MFD, such as an IP address, MAC address, MFD serial number, or other similar identification information. Further, the request may identify the selected backend services for which the user of the MFD has requested access. The MFD may also access a profile based on the received information identifying the MFD, as discussed in detail above, to automatically determine which services correspond to the user profile identified as corresponding to the requesting MFD.

At step 515, the document manager determines, based on a user input at the MFD or the profile retrieved from the profiler 280, which services should be made available to the requesting MFD. At step 520, the document manager server determines the requested services that require authentication. If a service does not require authentication, the user is granted access to this service without the need for additional authentication. Alternatively, at step 525, if the service requires authentication, then a template is generated by the plug-in corresponding to this service indicating the user credentials needed for authentication. At step 530, the document manager server determines if any default credentials are available for authentication templates corresponding to each requested service. These default credentials may be part of the plug-in corresponding to the service, or may be filled in based on the above mentioned profile information corresponding to an identified MFD. When step 530 determines that there are default credentials available for service, flow proceeds to step 535 which fills in default credentials. The templates for each service may be unique and some may only need a username, while others may require a username and password, and others may need no user credentials whatsoever.

Once the authentication templates corresponding to each service (e.g., plug-in) are completed to the extent that they can based on default login information and profile information corresponding to the requesting MFD, the monitoring system is accessed to retrieve any additional user credentials. At step 540, the document manager server secures the retrieved unique information corresponding to the requesting MFD, noted above (e.g., IP address, MAC address, machine serial number, etc.), and at step 545 uses this information to retrieve the additional user credential information cached at the monitoring system 45. The additional stored user credential information includes any credentials submitted to the monitoring system via the authentication device, as well as any additional user credential information corresponding to the user that is retrieved from the database of the monitoring system based on the received user credentials. Such information may include the identification of a user, a username, password, or any additional credentials that may be used to complete the authentication templates for each requested service. Since the user has already been authentication via the monitoring system 45, the document manager server considers this additional user credential data as trusted data and allows this data to be used to fill in any additional necessary user credentials.

At step 550, the additional user credential information retrieved from the monitoring system is used by the document manager server to complete the individual templates, and the document manager server generates a master template including the user credential information necessary to complete the login procedure. This master template is typically what would be used to generate a display at the MFD for user login. Step 555 determines whether the master template including all necessary user credentials is completed. If the template is not complete, a flag is set at step 560 indicating that additional user credentials are needed for the user to be authenticated to all requested services. If the master template is completed, the flag is not set. At step 565 the master template is sent to the MFD.

After receiving the master authentication template, at step 570 the MFD determines whether the template is flagged for display. If the template is flagged for display, a user interface is displayed on the MFD at step 580 and at step 585 the user is prompted to enter additional user credentials to complete the authentication process. At step 590, after entering the additional credentials, the user selects a displayed login button and at step 595 the additional user credentials are sent back to the document manager server for authentication. Alternatively, if no additional credentials are required by the user, step 595 sends the credentials are sent back to the document manager server for authentication. It should be noted that if the master template is complete, the document manager server may optionally not send the template back to the MFD, but instead simply perform user authentication and send data corresponding to the authenticated user's profile to the MFD, as discussed above. Further, even if the master template is complete, the MFD may display a login button forcing the user to submit the automatically filled in user credential information to the document manager server. Once the authentication procedure is complete, the document manager server would provide services according to the profile corresponding to the authenticated MFD and/or user as disclosed in U.S. application Ser. No. 11/092,831, filed Mar. 30, 2005, the entire contents of which is hereby incorporated by reference.

Figure 6:
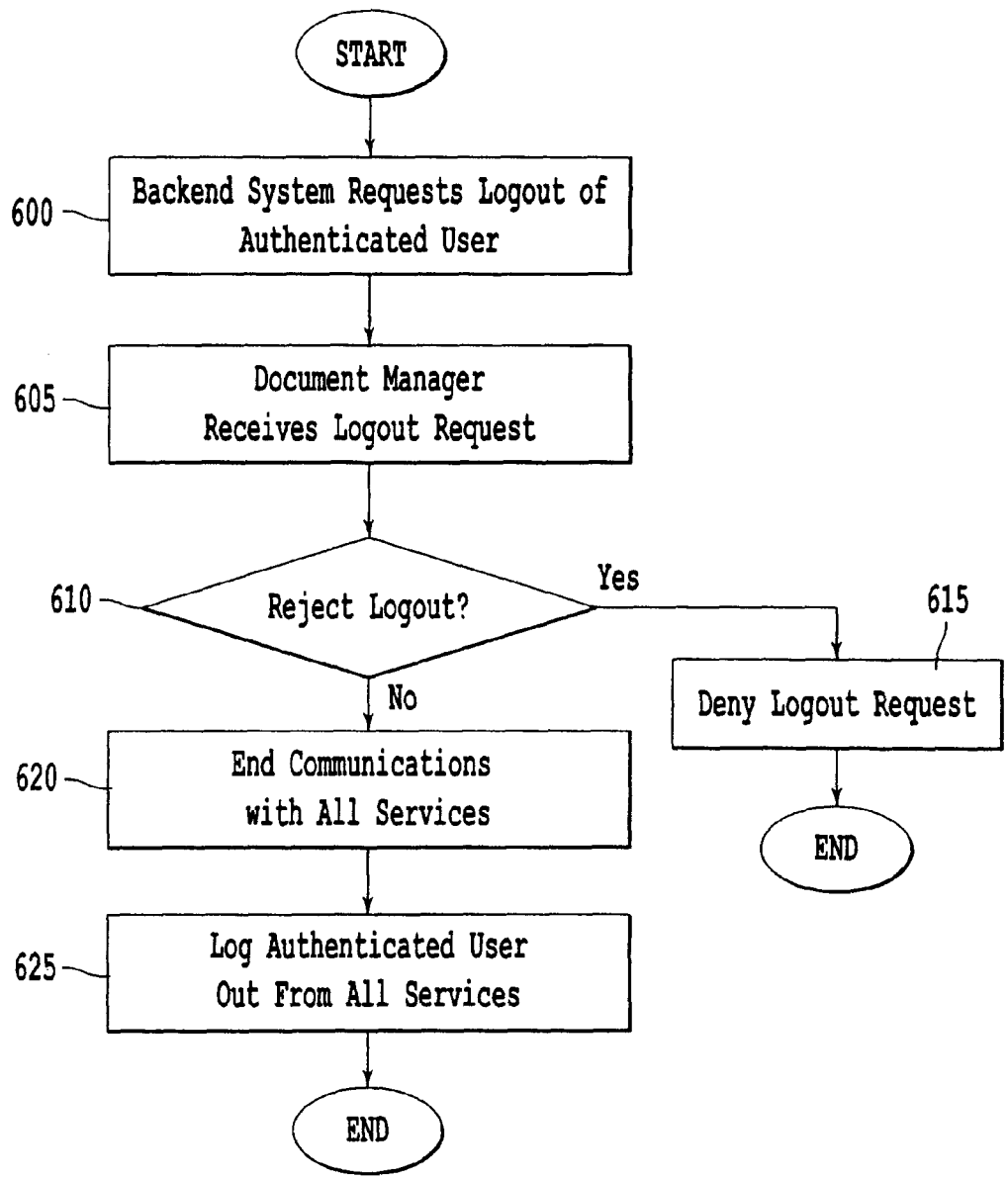
FIG. 6 is a flowchart showing a forced logout process according to one embodiment of the present invention.

FIG. 6 illustrates the steps performed during a logout operation. At step 600, a service connected to the document manager server (e.g., backend application), or the monitoring system 45, generates a logout request for the authenticated user and/or MFD. A logout request may be generated because the user's account has insufficient funds to continue the requested processing, the communication with the service has timed out, or for any other situation in which logout is desirable. At step 605, the document manager receives the logout request. Next, step 610 determines if logout request should be rejected based on the status of the MFD. Specifically, the logout request may be denied under the following exemplary conditions: when there are temporary communication threads running that are communicating with the document manager, when the user is accessing the interface of the MFD, when there is a scanning operation in progress, when there are pending jobs, etc. If a denial of the logout request is allowed, then the document manager has the option at step 615 of denying the logout request. If, however, step 610 determines that the logout request should not be rejected, flow proceeds to step 620 which ends communications with all services from the MFD. At step 625 the user and/or MFD is logged out from all services based on the request generated at the backend service or monitoring system 45.

The forced logout system coupled with the single sign-on capability allows the monitoring system 45 and document manager server 40 to perform coordinated user authentication and forced logout procedures at a system level.

FIG. 7 illustrates an overview of the hardware used to implement the present invention. An authentication device 1205 is located in, at, or around the MFD 10-30. As stated previously, the authentication device 1205 may be located at a position outside of the MFD 10-30 and provide communications only to the MFD 10-30 when necessary. As previously stated, devices such as memory readers, proximity sensors, biometric sensors or any other desired device may be used as the authentication device. The authentication device 1205 and/or biometric sensing device 1200, the MFD 10-30 and the monitoring system 45 are in communication via a wireless or wired connection 100 using well know protocols and signal transmission techniques. It should be noted that the authentication device 1205 may also be implemented in conjunction with a biometrics device 1200 to provide multi-factor user authentication. The biometric detection device 1200 may include a mechanism for detecting user characteristics such as fingerprints, a retinal scan, voice recognition, facial recognition component, or any other desired characteristic. This entered biometric information may be compared against a biometric parameter stored on the card itself, or with biometric data stored at the monitoring system 45. If the entered biometric information matches the biometric information stored in the card or the monitoring system 45 then the user is successfully granted access to the system. The interaction between these devices and the roles of each device has been described in detail above. FIG. 7 also illustrates the document manager server 40, LDAP server 60 and network application server 70-90 which are described in greater detail below.

Figure 8:
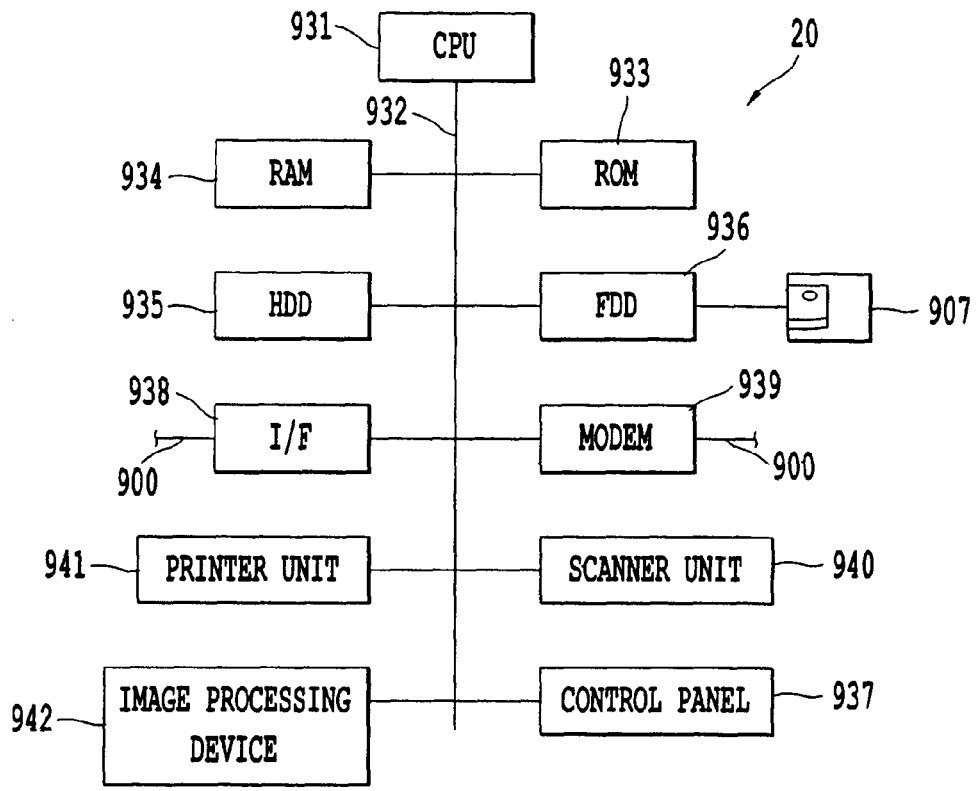
FIG. 8 is a block diagram illustrating an image processing device according to one embodiment of the present invention.
Figure 9:
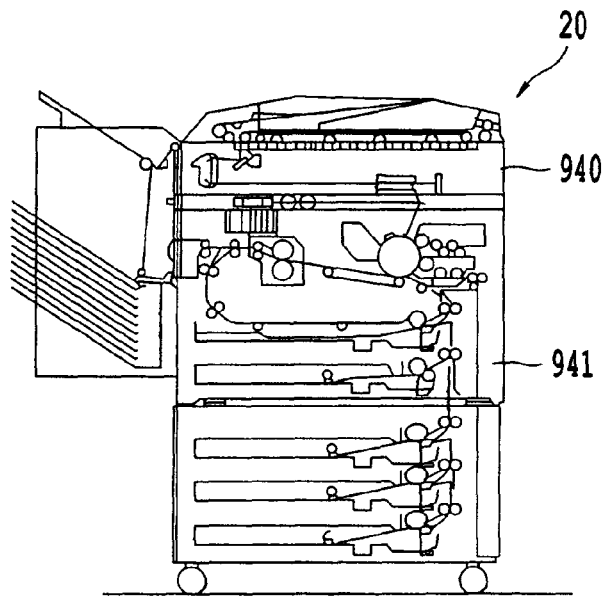
FIG. 9 is a schematic representation of an image processing device according to one embodiment of the present invention.

FIGS. 8-9 illustrate an example of the MFD 20, which includes a central processing unit (CPU) 931, and various elements connected to the CPU 931 by an internal bus 932. The CPU 931 services multiple tasks while monitoring the state of the MFD 20. The elements connected to the CPU 931 include a read only memory (ROM) 933, a random access memory (RAM) 934, a hard disk drive (HDD) 935, a floppy disk drive (FDD) 936 capable of receiving a floppy disk 907, a communication interface (I/F) 938, and a modem unit 939. In addition, a control panel 937, a scanner unit 940, a printer unit 941, and an image processing device 942 can be connected to the CPU 931 by the bus 932. Both the I/F 938 and the modem unit 939 are connected to a communication network 900.

In a preferred embodiment, the program code instructions for the MFD 20 are stored on the HDD 935 via an IC card. Alternatively, the program code instructions can be stored on the floppy 907 so that the program code instructions may be read by the FDD 936, transferred to the RAM 934 and executed by the CPU 931 to carry out the instructions. These instructions can be the instructions to perform the MFD's functions described above. These instructions permit the MFD 20 to interact with the document manager server 40 via browser 25 and to control the control panel 937 and the image processing units of the MFD 20.

During a start-up of the MFD 20, the program code instructions may be read by the CPU 931, transferred to the RAM and executed by the CPU 931. Alternatively, the program code instructions may be loaded to the ROM 933. It is therefore understood that in the present invention any of the floppy disk 907, the HDD 935, D the RAM 934, and the ROM 933 correspond to a computer readable storage medium capable of storing program code instructions. Other devices and medium that can store the instructions according to the present invention include for example magnetic disks, optical disks including DVDs, magneto-optical disks such as MOS, and semiconductor memory cards such as PC cards, compact flash cards, smart media, memory sticks, etc.

In a preferred embodiment, the control panel 937 includes a user interface that displays information allowing the user of the MFD 20 to interact with the document manager server 40. The display screen can be a LCD, a plasma display device, or a cathode ray tube CRT display. The display screen does not have to be integral with, or embedded in, the control panel 937, but may simply be coupled to the control panel 937 by either a wire or a wireless connection. The control panel 937 may include keys for inputting information or requesting various operations. Alternatively, the control panel 937 and the display screen may be operated by a keyboard, a mouse, a remote control, touching the display screen, voice recognition, or eye-movement tracking, or a combination thereof.

Figure 10:
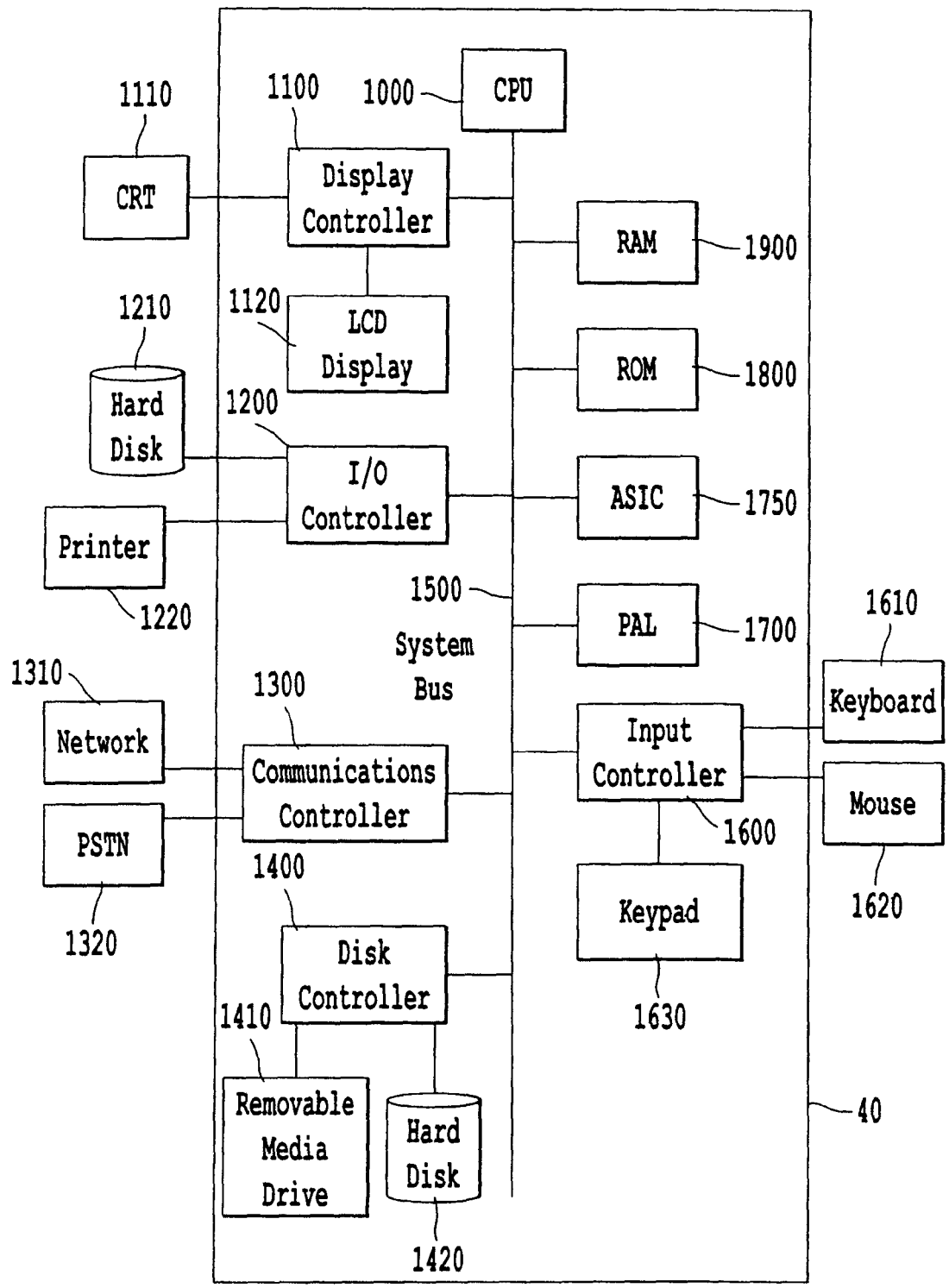
FIG. 10 is a block diagram illustrating a server according to one embodiment of the present invention.
Figure 11:
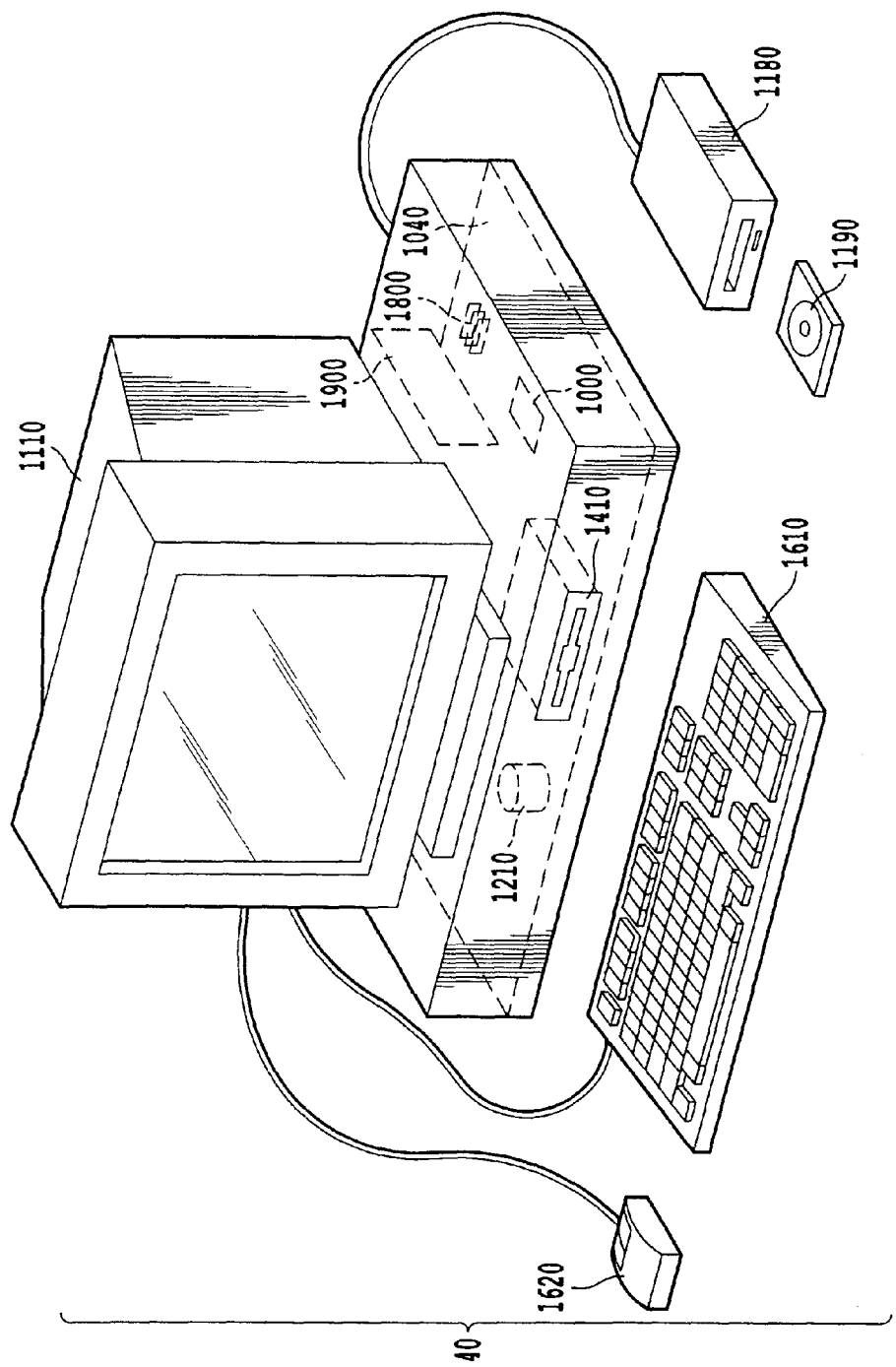
FIG. 11 is a schematic representation of a server according to one embodiment of the present invention.

FIG. 10 is a block diagram of a server 40, 50, 60 or the server corresponding to the monitoring system 45 according to one embodiment of the present invention. FIG. 11 is a schematic representation of the server. The server 40, 45, 50, 60 includes a central processing unit 1000 (CPU) that communicates with a number of other devices by way of a system bus 1500 on a platform 1040. The server 40, 45, 50, 60 includes a random access memory (RAM) 1900 that hosts temporary storage values used in implementing the authenticating, routing and managing functions of documents.

A conventional personal computer or computer workstation with sufficient memory and processing capability may also be configured to operate as the server 40, 45. The central processing unit 1000 is configured for high volume data transmission and performing a significant number of mathematical calculations in processing communications and database searches.

The ROM 1800 is preferably included in a semiconductor form although other read-only memory forms including optical media may be used to host application software and temporary results. The ROM 1800 connects to the system bus 1500 for use by the CPU 1000. The ROM 1800 includes computer readable instructions that, when executed by the CPU 1000, can perform the different authenticating, routing and managing functions discussed above associated with scanned documents from MFDs. The server may also include a special purpose logic device (e.g., application specific integrated circuit (ASIC) 1750) or a configurable logic device (e.g., programmable array logic (PAL) 1700). An input controller 1600 connects to the system bus 1500 and provides an interface with peripheral equipment, including a keyboard 1610, keypad 1630 and a pointing device such as a mouse 1620. The input controller 1600 may include different ports such as a mouse port in the form of a PS2 port or, for example, a universal serial bus (USB) port. The keyboard port for the input controller 1600 is in the form of a mini-DIN port although other connectors may be used as well. The input controller 1600 provides sound card connections so that external jacks on the sound card allow users to attach microphone speakers or an external sound source. The input controller 1600 also may include serial ports or parallel ports as well.

A disk controller 1400 is in the form of an IDE controller and connects via ribbon cables to a floppy disk drive 1410 as well as a hard disk drive 1420, a CD-ROM drive 1180 and a compact disk 1190. In addition, a PCI expansion slot is provided on the disk controller 1400 or mother board that hosts the CPU 1000. An enhanced graphic port expansion slot is provided and provides 3-D graphics with fast access to the main memory. The hard disk 1420 may also include a CD-ROM that may be readable as well as writeable. A communication controller 1300 provides a connection, for example by way of an Ethernet connection to a network 1310, which can be the network 100. In one embodiment, the network 1310 and the connection to the communication controller 1300 are made by way of a plurality of connections including a cable-modem connection, DSL connection, dial-up modem connection via PSTN 1320, for example, and the like that connect to the communication controller 130.

An input/output controller 1200 also provides connections to external components such as an external hard disk 1210, printer 1220, which can be MFD 10-30, for example, by way of an RS 232 port, a SCSI bus, an Ethernet or other network connection which supports any desired network protocol such as, but not limited to TCP/IP, IPX, IPX/SPX, or NetBEUI.

A display controller 1110 interconnects the system bus 1500 to a display device, such as a cathode ray tube (CRT) 1110 and/or a liquid crystal display (LCD) 1120. While a CRT is shown, a variety of other display devices may be used such as an LCD, or plasma display device.

The mechanisms and processes set forth in the present description may be implemented using a conventional general purpose microprocessor(s) programmed according to the teachings of the present specification, as will be appreciated to those skilled in the relevant arts. Appropriate software coding can readily be prepared by skilled programmers based on the teachings of the present disclosure, as will also be apparent to those skilled in the software art. In particular, the computer program product for authenticating, routing, and managing documents according to the present invention can be written in a number of computer languages including but not limited to C, C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art. Thus, the invention is not limited to the implementations shown in the specification, and ordinary programming and methods of generating interfaces which are alternative to web interfaces, http, etc. may be used.

The present invention thus also includes a computer-based product that may be hosted on a storage medium and include instructions that can be used to program a computer to perform a process in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

Advantageously, the present invention can be incorporated with the system and method for managing documents disclosed in U.S. application Ser. No. 11/092,836, filed Mar. 30, 2005, U.S. application Ser. No. 11/092,831 filed Mar. 30, 2005, U.S. application Ser. No. 11/092,829 filed Mar. 30, 2005, U.S. application Ser. No. 09/795,438, filed Mar. 1, 2001; U.S. application Ser. No. 10/243,645, filed Sep. 16, 2002; and U.S. application Ser. No. 10/294,607, filed Nov. 15, 2002; the entire content of each are hereby incorporated by reference.

Obviously, numerous additional modifications and variations of the present invention are possible in light of the above teachings. It is therefore to be understood that within the scope of the appended claims the present invention may be practiced otherwise than as specifically described herein.

The invention claimed is:

1. A method for authenticating a user of an image processing system, comprising:
    receiving user credentials at an authentication device corresponding to an image processing device;
    transmitting the user credentials to a monitoring server remotely connected to the image processing device via a network;
    judging, at the monitoring server, validity of the user credentials by comparing the received user credentials to stored user data;
    allowing access to a document manager server remotely connected to each of the monitoring server and the image processing device based on a result of said judging;
    requesting, at the image processing device, access to at least one of a plurality of backend applications available at an application server remotely connected to each of the monitoring server, the document manager server and the image processing device via the network;
    determining, at the document manager server, that the at least one of a plurality of backend applications requires user authentication;
    generating, at the document manager server, a template indicating user credential information necessary for a user to be authenticated at the at least one of a plurality of backend applications;
    transmitting, from the document manager sever, a request for at least the user credentials to the monitoring server; and
    completing, by the document manager server, the template indicating user credential information using the user credentials received from the monitoring server, which were previously transmitted to the monitoring server from the authentication device.

2. The method of claim 1, further comprising:
transmitting a result of the judging from the monitoring server to at least one of the image processing device and the document manager server.

3. The method of claim 1, wherein the request for access to at least one of a plurality of backend applications comprises at least one of an Internet Protocol (IP) address, Media Access Control (MAC) address, and serial number corresponding to the image processing device.

4. The method of claim 1, further comprising:
determining that the template can not be completed based on the user credentials received from the monitoring server;
transmitting the template to the image processing device; and
displaying a login interface at the image processing device prompting a user to enter additional user credential information missing from the template.

5. The method of claim 1, wherein receiving user credentials further comprises:
receiving one of a card input, retinal scan, fingerprint, voice, and personal identification number corresponding to a user.

6. A system for authenticating a user of an image processing system, comprising:
an authentication device corresponding to an image processing device and configured to receive user credentials;
a first communications interface at the image processing device configured to transmit the user credentials to a monitoring server remotely connected to the image processing device via a network;
a second communications interface at the monitoring server configured to receive the user credentials transmitted from the authentication device;
a first module, at the monitoring server, configured to judge validity of the user credentials by comparing the received user credentials to stored user data;
the monitoring server configured to allow access to a document manager server remotely connected to each of the monitoring server and the image processing device based on a result of said judging;
the first communications interface at the image processing device configured to request access to at least one of a plurality of backend applications available at an application server remotely connected to each of the monitoring server, the document manager server and the image processing device via the network;
a second module at the document manager server configured to determine that the at least one of a plurality of backend applications requires user authentication, and generate a template indicating user credential information necessary for a user to be authenticated at the at least one of a plurality of backend applications; and
a third communications interface at the document manager server configured to transmit a request for at least the user credentials to the monitoring server, wherein
the second module at the document manager server is further configured to complete the template indicating user credential information using the user credentials received from the monitoring server, which were previously transmitted to the monitoring server from the authentication device.

7. The system of claim 6, further comprising:
the second communications interface at the monitoring server configured to transmit a result of the judging to at least one of the image processing device and the document manager server.

8. The system of claim 6, wherein the request for access comprises at least one of an Internet Protocol (IP) address, Media Access Control (MAC) address, and serial number corresponding to the image processing device.

9. The system of claim 6, further comprising:
a third module at the document manager server configured to determine that the template can not be completed based on the user credentials received from the monitoring server;
the third communications interface at the document manager server configured to transmit the template to the image processing device; and
a display at the image processing device configured to display a login interface prompting a user to enter user credential information missing from the template.

10. The system of claim 6, wherein:
the authentication device is one of a card reader, retinal scanner, fingerprint reader, voice scanner, proximity scanner and keypad device.

11. A system for authenticating a user of an image processing system, comprising:
means for receiving user credentials at an authentication device corresponding to an image processing device;
means for transmitting the user credentials to a monitoring server remotely connected to the image processing device via a network;
means for judging, at the monitoring server, validity of the user credentials by comparing the received user credentials to stored user data;
means for allowing access to a document manager server remotely connected to each of the monitoring server and the image processing device based on a result of said judging;
means for requesting, at the image processing device, access to at least one of a plurality of backend applications available at an application server remotely connected to each of the monitoring server, the document manager server and the image processing device via the network;
means for determining, at the document manager server, that the at least one of a plurality of backend applications requires user authentication;
means for generating, at the document manager server, a template indicating user credential information necessary for a user to be authenticated at the at least one of a plurality of backend applications;
means for transmitting, from the document manager sever, a request for at least the user credentials to the monitoring server; and
means for completing, at the document manager server, the template indicating user credential information using the user credentials received from the monitoring server, which were previously transmitted to the monitoring server from the authentication device.

* * * * *